(12) United States Patent
Laaksonen et al.

(10) Patent No.: US 11,627,429 B2
(45) Date of Patent: Apr. 11, 2023

(54) PROVIDING SPATIAL AUDIO SIGNALS (71) Applicant: Nokia Technologies Oy, Espoo (FI)

(72) Inventors: Lasse Juhani Laaksonen, Tampere (FI); Jussi Artturi Leppänen, Tampere (FI); Arto Juhani Lehtiniemi, Lempäälä (FI); Miikka Tapani Vilermo, Siuro (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 17/208,371

(22) Filed: Mar. 22, 2021

(65) Prior Publication Data

US 2021/0329402 A1 Oct. 21, 2021

(30) Foreign Application Priority Data

Apr. 17, 2020 (EP) .................................... 20170124

(51) Int. Cl.
| | |
|---|---|
| *H04S 7/00* | (2006.01) |
| *G06F 3/16* | (2006.01) |
| *G10L 19/008* | (2013.01) |
| *G10L 19/24* | (2013.01) |
| *H04R 5/02* | (2006.01) |
| *H04R 5/033* | (2006.01) |
| *H04S 3/00* | (2006.01) |

(52) U.S. Cl.
CPC .............. *H04S 7/304* (2013.01); *G06F 3/162* (2013.01); *G06F 3/167* (2013.01); *G10L 19/008* (2013.01); *G10L 19/24* (2013.01); *H04R 5/02* (2013.01); *H04R 5/033* (2013.01); *H04S 3/008* (2013.01); *H04S 7/308* (2013.01); *H04S 2400/11* (2013.01)

(58) Field of Classification Search
CPC .......... H04R 2201/107; H04R 2420/07; H04R 1/1041; H04R 5/04
USPC ..................... 381/58, 74, 309, 310
See application file for complete search history.

(56) References Cited

U.S. PATENT DOCUMENTS

2013/0279724 A1    10/2013   Stafford et al.
2014/0146976 A1*   5/2014    Rundle ................ H04R 1/1041
                                               381/71.6
(Continued)

FOREIGN PATENT DOCUMENTS

CN        108141696 A       6/2018
WO        WO 2006/103584   * 10/2006
(Continued)

OTHER PUBLICATIONS

"Apple's AirPods Business is Bigger Than You Think", Fortune, Retrieved on Mar. 17, 2021, Webpage available at : https://fortune.com/2019/08/06/apple-airpods-business/.
(Continued)

*Primary Examiner* — Yosef K Laekemariam
(74) *Attorney, Agent, or Firm* — Harrington & Smith (57) ABSTRACT

An apparatus, method and computer program product for: providing spatial audio signals for output for a first user via a first audio device and a second audio device, receiving an indication of deactivation of the second audio device, receiving an indication that the second audio device is re-activated by a second user, and performing, in response to receiving the indication that the second audio device is re-activated by the second user, a modification of the spatial audio signals.

18 Claims, 5 Drawing Sheets

(56) References Cited

U.S. PATENT DOCUMENTS

2019/0166428 A1\* 5/2019 Bae .................... H04M 1/6066
2019/0394607 A1 12/2019 Laaksonen et al. .............. 7/304

FOREIGN PATENT DOCUMENTS

WO 2019/196101 A1 10/2019
WO 2021/023505 A1 2/2021

OTHER PUBLICATIONS

Extended European Search Report received for corresponding European Patent Application No. 20170124.0, dated Sep. 15, 2020, 7 pages.

\* cited by examiner

PROVIDING SPATIAL AUDIO SIGNALS

TECHNICAL FIELD

The present application relates generally to spatial audio. More specifically, the present application relates to providing spatial audio signals.

BACKGROUND

The amount of multimedia content increases continuously. Users create and consume multimedia content, and it has a big role in modern society.

SUMMARY

Various aspects of examples of the invention are set out in the claims. The scope of protection sought for various embodiments of the invention is set out by the independent claims. The examples and features, if any, described in this specification that do not fall under the scope of the independent claims are to be interpreted as examples useful for understanding various embodiments of the invention.

According to a first aspect of the invention, there is provided an apparatus comprising means for performing: providing spatial audio signals for output for a first user via a first audio device and a second audio device, receiving an indication of deactivation of the second audio device, receiving an indication that the second audio device is re-activated by a second user, and performing, in response to receiving the indication that the second audio device is re-activated by the second user, a modification of the spatial audio signals.

According to a second aspect of the invention, there is provided a method comprising providing spatial audio signals for output for a first user via a first audio device and a second audio device, receiving an indication of deactivation of the second audio device, receiving an indication that the second audio device is re-activated by a second user, and performing, in response to receiving the indication that the second audio device is re-activated by the second user, a modification of the spatial audio signals.

According to a third aspect of the invention, there is provided a computer program comprising instructions for causing an apparatus to perform at least the following: providing spatial audio signals for output for a first user via a first audio device and a second audio device, receiving an indication of deactivation of the second audio device, receiving an indication that the second audio device is re-activated by a second user, and performing, in response to receiving the indication that the second audio device is re-activated by the second user, a modification of the spatial audio signals.

According to a fourth aspect of the invention, there is provided an apparatus comprising at least one processor and at least one memory including computer program code, the at least one memory and the computer program code configured to with the at least one processor, cause the apparatus at least to: provide spatial audio signals for output for a first user via a first audio device and a second audio device, receive an indication of deactivation of the second audio device, receive an indication that the second audio device is re-activated by a second user, and perform, in response to receiving the indication that the second audio device is re-activated by the second user, a modification of the spatial audio signals.

According to a fifth aspect of the invention, there is provided a non-transitory computer readable medium comprising program instructions for causing an apparatus to perform at least the following: providing spatial audio signals for output for a first user via a first audio device and a second audio device, receiving an indication of deactivation of the second audio device, receiving an indication that the second audio device is re-activated by a second user, and performing, in response to receiving the indication that the second audio device is re-activated by the second user, a modification of the spatial audio signals.

According to a sixth aspect of the invention, there is provided a computer readable medium comprising program instructions for causing an apparatus to perform at least the following: providing spatial audio signals for output for a first user via a first audio device and a second audio device, receiving an indication of deactivation of the second audio device, receiving an indication that the second audio device is re-activated by a second user, and performing, in response to receiving the indication that the second audio device is re-activated by the second user, a modification of the spatial audio signals.

BRIEF DESCRIPTION OF THE DRAWINGS

Some example embodiments will now be described with reference to the accompanying drawings.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Example embodiments relate to an apparatus configured to receive captured audio signals and provide spatial audio signals for output.

Some example embodiments relate to an apparatus configured to provide spatial audio signals for output for a first user via a first audio device and a second audio device, receive an indication of deactivation of the second audio device, receive an indication that the second audio device is re-activated by a second user, and perform, in response to receiving the indication that the second audio device is re-activated by the second user, a modification of the spatial audio signals.

Some example embodiments relate to an apparatus comprising an audio codec. An audio codec is a codec that is configured to encode and/or decode audio signals. An audio codec may comprise, for example, a speech codec that is configured to encode and/or decode speech signals. In practice, an audio codec comprises a computer program implementing an algorithm that compresses and decompresses digital audio data. For transmission purposes, the aim of the algorithm is to represent high-fidelity audio signal with minimum number of bits while retaining quality. In that way, storage space and bandwidth required for transmission of an audio file may be reduced.

Different audio codecs may have different bit rates. A bit rate refers to the number of bits that are processed or transmitted over a unit of time. Typically, a bit rate is expressed as a number of bits or kilobits per second (e.g., kbps or kbits/second). A bit rate may comprise a constant bit rate (CBR) or a variable bit rate (VBR). CBR files allocate a constant amount of data for a time segment while VBR files allow allocating a higher bit rate, that is more storage space, to be allocated to the more complex segments of media files and allocating a lower bit rate, that is less storage space, to be allocated to less complex segments of media files. A VBR operation may comprise discontinuous transmission (DTX) that may be used in combination with CBR or VBR operation. In DTX operation, parameters may be updated selectively to describe, for example, a background noise level and/or spectral noise characteristics during inactive periods such as silence, whereas regular encoding may be used during active periods such as speech.

There are different kinds of audio/speech codecs, for example, an enhanced voice services (EVS) codec suitable for improved telephony and teleconferencing, audio-visual conferencing services and streaming audio. Another example codec is an immersive voice and audio services (IVAS) codec. An aim of the IVAS codec is to provide support for real-time conversational spatial voice, multi-stream teleconferencing, virtual reality (VR) conversational communications and/or user generated live and on-demand content streaming Conversational communication may comprise, for example, real-time two-way audio between a plurality of users. An IVAS codec provides support for, for example, from mono to stereo to fully immersive audio encoding, decoding and/or rendering. An immersive service may comprise, for example, immersive voice and audio for virtual reality (VR) or augmented reality (AR), and a codec may be configured to handle encoding, decoding and rendering of speech, music and generic audio. A codec may also support channel-based audio, object-based audio and/or scene-based audio.

Channel-based audio may, for example, comprise creating a soundtrack by recording a separate audio track (channel) for each loudspeaker or panning and mixing selected audio tracks between at least two loudspeaker channels. Common loudspeaker arrangements for channel-based surround sound systems are 5.1 and 7.1, which utilize five and seven surround channels, respectively, and one low-frequency channel. A drawback of channel-based audio is that each soundtrack is created for a specific loudspeaker configuration such as 2.0 (stereo), 5.1 and 7.1.

Object-based audio addresses this drawback by representing an audio field as a plurality of separate audio objects, each audio object comprising one or more audio signals and associated metadata. An audio object may be associated with metadata that defines a location or trajectory of that object in the audio field. Object-based audio rendering comprises rendering audio objects into loudspeaker signals to reproduce the audio field. As well as specifying the location and/or movement of an object, the metadata may also define the type of object, for example, acoustic characteristics of an object, and/or the class of renderer that is to be used to render the object. For example, an object may be identified as being a diffuse object or a point source object. Object-based renderers may use the positional metadata with a rendering algorithm specific to the particular object type to direct sound objects based on knowledge of loudspeaker positions of a loudspeaker configuration.

Scene-based audio combines the advantages of object-based and channel-based audio and it is suitable for enabling truly immersive VR audio experience. Scene-based audio comprises encoding and representing three-dimensional (3D) sound fields for a fixed point in space. Scene-based audio may comprise, for example, ambisonics and parametric immersive audio. Ambisonics comprises a full-sphere surround sound format that in addition to a horizontal plane comprises sound sources above and below a listener. Ambisonics may comprise, for example, first-order ambisonics (FOA) comprising four channels or higher-order ambisonics (HOA) comprising more than four channels such as 9, 16, 25, 36, or 49 channels. Parametric immersive audio may comprise, for example, metadata-assisted spatial audio (MASA).

Spatial audio may comprise a full sphere surround-sound to mimic the way people perceive audio in real life. Spatial audio may comprise audio that appears from a user's position to be assigned to a certain direction and/or distance. Therefore, the perceived audio may change with the movement of the user or with the user turning. Spatial audio may comprise audio created by sound sources, ambient audio or a combination thereof. Ambient audio may comprise audio that might not be identifiable in terms of a sound source such as traffic humming, wind or waves, for example. The full sphere surround-sound may comprise a spatial audio field and the position of the user or the position of the capturing device may be considered as a reference point in the spatial audio field. According to an example embodiment, a reference point comprises the centre of the audio field.

Spatial audio may be provided in an immersive voice or video call. Providing an immersive voice or video call may comprise creating sound that a listener perceives as coming from an infinite number of points around, above and below the listener. A user may experience an immersive voice or video call using a pair of headphones such as a pair of wireless ear buds. Sometimes the user may wish to share one of the headphones with another person in order to allow the other person to join the voice or video call. However, in such a case the audio presentation and audio capture might not be optimal. For example, if each of the two persons are using one ear bud, one of the ear buds might be configured to act as a microphone and one might be configured to act as a loudspeaker by default. In such a case providing a good user experience for both the users is challenging.

Figure 1:
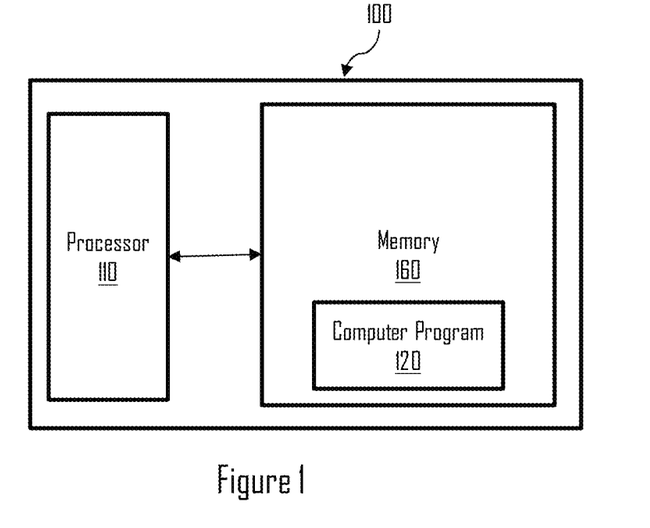
FIG. 1 shows a block diagram of an example apparatus in which examples of the disclosed embodiments may be applied.

FIG. 1 is a block diagram depicting an apparatus 100 operating in accordance with an example embodiment of the invention. The apparatus 100 may be, for example, an electronic device such as a chip or a chipset. The apparatus 100 comprises one or more control circuitry, such as at least one processor 110 and at least one memory 160, including one or more algorithms such as computer program code 120 wherein the at least one memory 160 and the computer program code are 120 configured, with the at least one processor 110 to cause the apparatus 100 to carry out any of example functionalities described below.

In the example of FIG. 1, the processor 110 is a control unit operatively connected to read from and write to the memory 160. The processor 110 may also be configured to receive control signals received via an input interface and/or the processor 110 may be configured to output control signals via an output interface. In an example embodiment the processor 110 may be configured to convert the received control signals into appropriate commands for controlling functionalities of the apparatus 100.

The at least one memory 160 stores computer program code 120 which when loaded into the processor 110 control the operation of the apparatus 100 as explained below. In other examples, the apparatus 100 may comprise more than one memory 160 or different kinds of storage devices.

Computer program code 120 for enabling implementations of example embodiments of the invention or a part of such computer program code may be loaded onto the apparatus 100 by the manufacturer of the apparatus 100, by a user of the apparatus 100, or by the apparatus 100 itself based on a download program, or the code can be pushed to the apparatus 100 by an external device. The computer program code 120 may arrive at the apparatus 100 via an electromagnetic carrier signal or be copied from a physical entity such as a computer program product, a memory device or a record medium such as a Compact Disc (CD), a Compact Disc Read-Only Memory (CD-ROM), a Digital Versatile Disk (DVD) or a Blu-ray disk.

Figure 2:
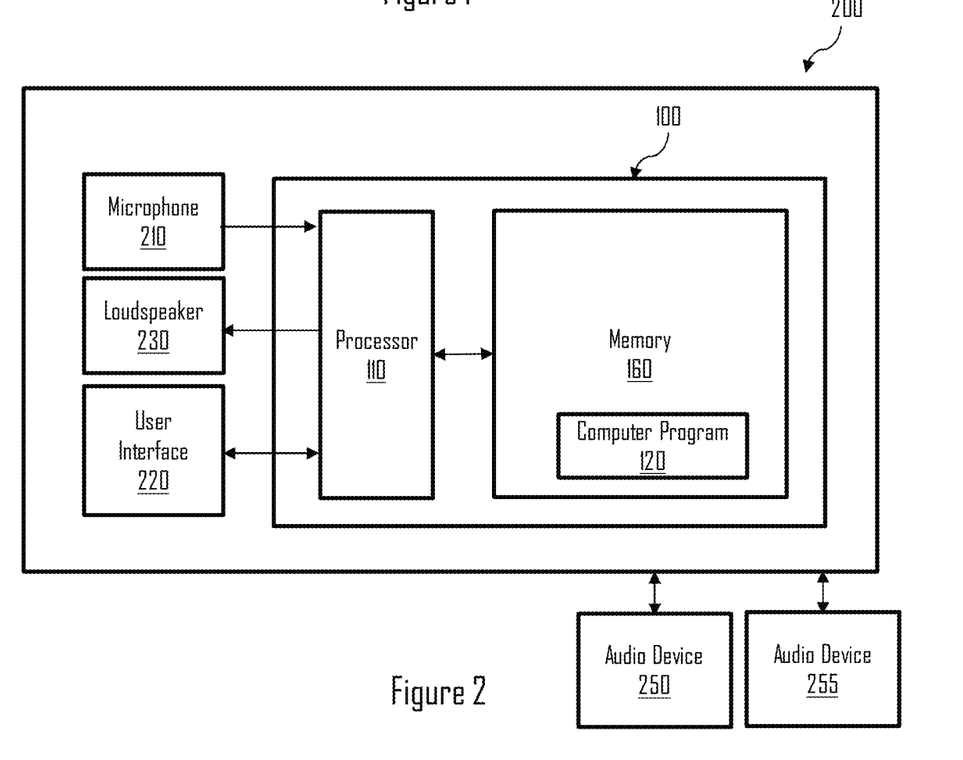
FIG. 2 shows a block diagram of another example apparatus in which examples of the disclosed embodiments may be applied.

FIG. 2 is a block diagram depicting an apparatus 200 in accordance with an example embodiment of the invention. The apparatus 200 may be an electronic device such as a hand-portable device, a mobile phone or a Personal Digital Assistant (PDA), a Personal Computer (PC), a laptop, a desktop, a tablet computer, a wireless terminal, a communication terminal, a game console, a music player, an electronic book reader (e-book reader), a positioning device, a digital camera, a household appliance, a CD-, DVD or Blu-ray player, or a media player. In the examples below it is assumed that the apparatus 200 is a mobile computing device or a part of it.

In the example embodiment of FIG. 2, the apparatus 200 is illustrated as comprising the apparatus 100, one or more microphones 210, one or more loudspeakers 230 and a user interface 220 for interacting with the apparatus 200 (e.g. a mobile computing device). The apparatus 200 may also comprise a display configured to act as a user interface 220. For example, the display may be a touch screen display. In an example embodiment, the display and/or the user interface 220 may be external to the apparatus 200, but in communication with it.

Additionally or alternatively, the user interface 220 may also comprise a manually operable control such as a button, a key, a touch pad, a joystick, a stylus, a pen, a roller, a rocker, a keypad, a keyboard or any suitable input mechanism for inputting and/or accessing information. Further examples include a camera, a speech recognition system, eye movement recognition system, acceleration-, tilt- and/or movement-based input systems. Therefore, the apparatus 200 may also comprise different kinds of sensors such as one or more gyro sensors, accelerometers, magnetometers, position sensors and/or tilt sensors.

According to an example embodiment, the apparatus 200 is configured to establish radio communication with another device using, for example, a Bluetooth, WiFi, radio frequency identification (RFID), or a near field communication (NFC) connection. For example, the apparatus 200 may be configured to establish radio communication with a wireless headphone, augmented/virtual reality device or the like.

According to an example embodiment, the apparatus 200 is operatively connected to a first audio device 250 and a second audio device 255. According to an example embodiment, the apparatus 200 is wirelessly connected to the first audio device 250 and the second audio device 255. For example, the apparatus 200 may be connected to the first audio device 250 and the second audio device 255 over a Bluetooth connection or the like.

The first audio device 250 may comprise at least one microphone for capturing audio signals and at least one loudspeaker for playing back received audio signals. Similarly to the first audio device 250, the second audio device 255 may comprise at least one microphone for capturing audio signals and at least one loudspeaker for playing back received audio signals. The first audio device 250 and the second audio device 255 may further be configured to filter out background noise and/or detect in-ear placement.

According to an example embodiment, the first audio device 250 and the second audio device 255 are configured to function as a pair. For example, the first audio device 250 may comprise a first wireless headphone and the second audio device 255 may comprises a second wireless headphone such that the first wireless headphone and the second wireless headphone are configured to function as a pair. Functioning as a pair may comprise, for example, providing stereo output for a user using the first audio device 250 and the second audio device 255.

According to an example embodiment, the first audio device 250 comprises a first wireless headphone and the second audio device 255 comprises a second wireless headphone, the first wireless headphone and the second wireless headphone configured to function as a pair.

The first audio device 250 and the second audio device 255 may also be configured such that the first audio device 250 and the second audio device 255 may be used separately and/or independently of each other. For example, same or different audio information may be provided to the first audio device 250 and the second audio device 255, or audio information may be directed to one audio device such as the first audio device 250 and the other audio device such as the second audio device 255 may act as a microphone.

According to an example embodiment, the apparatus 200 is configured to communicate with the first audio device 250 and the second audio device 255. The apparatus 200 may be configured to communicate with the first audio device 250 and the second audio device 255 directly or indirectly. Communicating with the first audio device 250 and the second audio device 255 indirectly may comprise communicating with a first audio device 250 that is configured to communicate with the second audio device 255 or communicating with the second audio device 255 that is configured to communicate with the first audio device 250.

According to an example embodiment, communicating with the first audio device 250 and the second audio device 255 comprises providing audio signals and/or receiving audio signals. For example, the apparatus 200 may be configured to provide audio signals to the first audio device 250 and/or the second audio device 255 and receive audio signals from the first audio device 250 and the second audio device 255.

Providing spatial audio signals to the first audio device 250 and the second audio device 255 may comprise encoding, using an audio codec, the audio signals to be provided to the first audio device 250 and the second audio device 255. The audio codec may comprise, for example, an IVAS (immersive voice and audio services) codec or a suitable Bluetooth audio codec. According to an example embodiment, the audio codec is configured to output audio in a plurality of supported formats including mono, stereo, and binaural spatial audio.

Receiving audio signals from the first audio device 250 and/or the second audio device 255 or receiving audio signals from a remote user may comprise decoding, using an audio codec, the audio signals. The audio codec may comprise, for example, an IVAS codec or a suitable Bluetooth audio codec.

According to an example embodiment, the apparatus 200 is configured to establish a radio connection with another apparatus. For example, the apparatus 200 may be configured to establish an audio or video call. As another example, the apparatus 200 may be configured to establish an immersive voice or video call.

According to an example embodiment, the apparatus 200 comprises an audio codec comprising a decoder for decompressing received data such as an audio stream and/or an encoder for compressing data for transmission. Received audio data may comprise, for example, an encoded bitstream comprising binary bits of information that may be transferred from one device to another. According to an example embodiment, the apparatus 200 comprises an audio codec for establishing an immersive voice or video call.

According to an example embodiment, the apparatus 200 is configured to provide spatial audio signals for output for a first user via the first audio device 250 and the second audio device 255. For example, the apparatus 200 may be configured to provide spatial audio signals for output via at least one loudspeaker of the first audio device 250 and at least one loudspeaker of the second audio device 255 over a wireless connection. The spatial audio signals may comprise, for example, speech signals representative of speech of a caller or streamed audio information.

Without limiting the scope of the claims, an advantage of providing spatial audio signals for output via a first audio device and a second audio device is that immersive audio may be provided for a user.

According to an example embodiment, the spatial audio signals comprise a first audio signal and a second audio signal. According to an example embodiment, the apparatus 200 is configured to provide the first audio signal for output via the first audio device 250 and the second audio signal for output via the second audio device 255. According to an example embodiment, the first audio signal provided for output via the first audio device 250 is different from the second audio signal provided for output via the second audio device 255.

According to an example embodiment, the first audio signal comprises an audio object and the second audio signal comprises ambient audio.

According to an example embodiment, an audio object comprises audio data associated with metadata. Metadata associated with an audio object provides information on the audio data. Information on the audio data may comprise, for example, one or more properties of the audio data, one or more characteristics of the audio data and/or identification information relating to the audio data. For example, metadata may provide information on a position associated with the audio data in a spatial audio field, movement of the audio object in the spatial audio field and/or a function of the audio data.

According to an example embodiment, an audio object comprises an audio stream. An audio stream may comprise a live audio stream comprising real-time audio. An audio stream may be streamed together with other types of media streaming or audio may be streamed as a part of other types of media streaming such as video streaming. An audio stream may comprise, for example, audio from a live performance or the like.

According to an example embodiment, the audio object comprises a spatial audio object comprising one or more audio signals and associated metadata that defines a location and/or trajectory of the second audio object in a spatial audio field.

Without limiting the scope of the claims, an advantage of an audio object is that metadata may be associated with audio signals such that the audio signals may be reproduced by defining their position in a spatial audio field.

According to an example embodiment, the apparatus 200 is configured to provide the spatial audio signals during a voice or video call. The voice or video call may comprise, for example, an immersive voice or video call. According to an example, embodiment, an immersive voice or video call comprises creating sound that a listener perceives as coming from an infinite number of points around the listener.

According to an example embodiment, the apparatus 200 is configured to receive an indication of deactivation of the second audio device 255. An indication of deactivation of the second audio device 255 may relate to a function of the second audio device 255 or a status of the second audio device 255. The apparatus 200 may be configured to receive an indication of deactivation of the second audio device in response to an automatic deactivation of the second audio device 255 or a manual deactivation of the second audio device 255.

According to an example embodiment, the indication of deactivation comprises an indication of discontinued use of the second audio device 255. Receiving an indication of discontinued use may comprise, for example, receiving an indication of interruption or termination of an audio function such as playback of audio by the second audio device 255, receiving an indication of an inactive status of the second audio device 255, or the like. For example, deactivation of an audio device may comprise disabling the second audio device 255, disconnecting the second audio device 255 from the apparatus 200, removing the second audio device 255 from an in-ear position, or the like. The apparatus 200 may be configured to receive the indication from the second audio device 255.

According to an example embodiment, the apparatus 200 is configured to determine that the second audio device 255 is deactivated. Determining that the second audio device 255 is deactivated may comprise determining discontinued use of the second audio device 255 such as determining that an audio function is interrupted or terminated, determining that the status of the second audio device 255 in inactive, or the like. For example, determining that the second audio device 255 is deactivated may comprise detecting a change of status of the second audio device 255, detecting a change of status of the connection between the second audio device 255 and the apparatus 200, receiving measurement data relating to the status of the second audio device 255, receiving an indication from the second audio device 255 that the second audio device is deactivated, or a combination thereof. A change of status of the second audio device 255 may comprise a change from a first mode to a second mode such as from an active mode to a sleep mode or from an active mode to a powered-off mode. A change of status of the connection between the second audio device 255 and the apparatus 200 may comprise, for example, a change from a connected mode to a disconnected mode. Receiving measurement data may comprise receiving data relating to movement of the first audio device 250 with respect to the second audio device 255 or movement of the second audio device 255 with respect to the first audio device. As another example, the measurement data may comprise data relating to relative positions of the first audio device 250 and the second audio device 255 such as an indication that there is a change in distance between the first audio device 250 and the second audio device 255.

According to an example embodiment, the apparatus 200 is configured to adapt the spatial audio signals provided to the first audio device 250 and the second audio device 255 in response to receiving the indication of deactivation of the second audio device 255. According to another example embodiment, the apparatus 200 is configured to provide the spatial audio signals to the first audio device 250 and the second audio device 255 without adaptation of the spatial audio signals. Adapting the spatial audio signals provided to the first audio device 250 and the second audio device 255 may comprise modifying the audio signals.

In the following, a modification performed in response to receiving the indication of deactivation of the second audio device 255 is referred to as a first modification.

According to an example embodiment, the apparatus 200 is configured to perform, in response to receiving the indication of deactivation of the second audio device 255, a first modification of the spatial audio signals.

The first modification may comprise modifying the spatial audio signals provided for the first user such that playback of the spatial audio is optimized for the first user using a single audio device such as the first audio device 250. Therefore, the first modification may comprise, for example, adapting the spatial audio signals to mono playback by maintaining the most important audio component and removing less important audio components. For example, the first modification may comprise maintaining a voice object and removing ambient audio. As another example, the first modification may comprise performing a mono-mix from a voice object and ambient audio.

According to an example embodiment, the apparatus 200 is configured to determine one or more audio components included in the spatial audio signals that are provided to the first audio device 250 and the second audio device 255 and perform the first modification based on the one or more audio components. According to an example embodiment, the first modification of the spatial audio signals comprises re-routing audio signals from the second audio device 255 to the first audio device 250. According to an example embodiment, the first modification of the spatial audio signals comprises re-routing at least one audio object provided to the second audio device 255 to the first audio device 250. For example, the apparatus 200 may be configured to re-route a voice object that is provided to the second audio device 255 to the first audio device 250.

According to an example embodiment, the first modification of the spatial audio signals comprises removing ambient audio. For example, the first modification of the spatial audio signals may comprise removing ambient audio provided to the first audio device 250.

According to an example embodiment, the first modification of the spatial audio signals comprises mixing at least one audio signal for mono playback.

Without limiting the scope of the claims, performing a first modification of the spatial audio signals in response to receiving the indication of deactivation of the second audio device is that provision of the spatial audio signals may be adapted dynamically based on the number of available audio devices.

According to an example embodiment, the apparatus 200 is configured to perform, in response to receiving the indication of deactivation of the second audio device 255, a first modification of the spatial audio signals, if a deactivation condition is fulfilled. A deactivation condition may comprise, for example, a period of time for observing whether the second audio device 255 is deactivated temporarily or for a longer period of time. The period may comprise a predetermined period of time such as 5 to 10 seconds.

According to an example embodiment, the apparatus 200 is configured to receive an indication that the second audio device 255 is re-activated by a second user. Re-activation of an audio device may comprise, for example, enabling the second audio device 255, connecting the second audio device 255 to the apparatus 200, detecting an in-ear position of the second audio device 255, or the like.

According to an example embodiment, the apparatus 200 is configured to receive the indication that the second audio device 255 is re-activated from the second audio device 255.

According to an example embodiment, the apparatus 200 is configured to determine that the second audio device 255 is re-activated. Determining that the second audio device 255 is re-activated may comprise, for example, detecting a change of status of the second audio device 255, detecting a change of status of the connection between the second audio device 255 and the apparatus 200, receiving measurement data relating to the status of the second audio device 255, receiving an indication from the second audio device 255 that the second audio device is re-activated, or a combination thereof.

According to an example embodiment, the apparatus 200 is configured to determine whether the second audio device 255 is re-activated by a user different from the first user. According to an example embodiment, the apparatus 200 is configured to determine whether the second audio device 255 is re-activated by a second user.

According to an example embodiment, the apparatus is configured to determine that the second audio device 255 is re-activated by a second user. The apparatus 200 may be configured to determine that the second audio device 255 is re-activated by a second user based on measurement data. The measurement data may relate to usage of the first audio device 250 and the second audio device 255. The measurement data may indicate that the first audio device 250 and the second audio device 255 are used by different users. For example, assuming the first audio device 250 comprises a first headphone and the second audio device 255 comprises a second headphone, typically the distance between the first headphone and the second headphone or the altitudes of the first headphone and the second headphone remain substantially the same. Therefore, the apparatus 200 may be configured to determine that the second audio device 255 is re-activated by a second user based on changed usage data of the first audio device 250 and/or the second audio device 255.

The measurement data may relate to, for example, a distance between the first audio device 250 and the second audio device 255, a change in distance between the first audio device 250 and the second audio device 255, motion of the first audio device 250 or the second audio device 255, a difference between the positions of the first audio device 250 and the second audio device 255 (e.g. a difference between the altitude of the first audio device 250 and the altitude of the second audio device 255), characteristics of an ear, a change of characteristics of an ear, or the like.

The apparatus 200 may be configured to determine or receive information on the characteristics of an ear of the first user and/or the second user based on information received from the first audio device 250 and/or the second audio device 255, respectively.

According to an example embodiment, the indication that the second audio device is re-activated comprises information relating to a distance between the first audio device 250 and the second audio device 255. The information relating to distance between the first audio device and the second audio device may comprise, for example, an absolute distance, an indication that a change of distance is above a predefined threshold value or an indication that the distance between the first audio device 250 and the second audio device 255 has changed.

According to an example embodiment, the first user is different from the second user.

According to an example embodiment, the apparatus 200 is configured to adapt the spatial audio signals provided to the first audio device 250 and the second audio device 255 in response to receiving the indication of re-activation of the second audio device 255. Adapting the spatial audio signals provided to the first audio device 250 and the second audio device 255 may comprise modifying the audio signals.

In the following, a modification performed in response to receiving the indication of re-activation of the second audio device 255 is referred to as a second modification.

According to an example embodiment, the apparatus 200 is configured to perform, in response to receiving the indication that the second audio device 255 is re-activated by the second user, a second modification of the spatial audio signals.

The second modification may comprise modifying the spatial audio signals such that the spatial audio is optimized for the first user and the second user. The second modification may comprise, for example, adapting the spatial audio signals to a first mono playback and a second mono playback. For example, the second modification may comprise maintaining a voice object and adding playback of at least one additional component such as ambient audio.

According to an example embodiment, the second modification of the spatial audio signals comprises introducing ambient audio to the spatial audio signals.

According to an example embodiment, the second modification of the spatial audio signals comprises providing to the second audio device 255 an audio signal similar to an audio signal provided to the first audio device 250. For example, the second modification of the spatial audio signals may comprise providing to the second audio device 255 a mono signal similar to a mono signal provided to the first audio device 250.

As mentioned above, the first audio device 250 may comprise at least one microphone and the second audio device 255 may comprise at least one microphone. In other words, if the first user uses the first audio device 250 and the second user uses the second audio device 255, both the users are able to provide audio signals such as speech signals during a voice or video call.

According to an example embodiment, the apparatus 200 is configured to receive captured audio signals from the first audio device 250 and the second audio device 255. Therefore, the first audio device 250 may provide a first audio source and the second audio device 255 may provide a second audio source, the first audio source and the second audio source being independent audio sources. According to an example embodiment, the apparatus 200 is configured to receive captured audio signals from the first audio device 250 and the second audio device 255 during a voice or video call.

According to an example embodiment, the apparatus 200 is configured to provide captured audio signals from the first audio device 250 and captured audio signals from the second audio device 255 to a remote user.

According to an example embodiment, the apparatus 200 is configured to perform, in response to receiving an indication that the second audio device 255 is re-activated by the second user, a modification of captured audio signals provided to the remote user.

Modification of captured audio signals may comprise modifying the captured audio signals based on contextual information.

According to an example embodiment, modification of captured audio signals comprises providing captured audio signals based on context of the first audio device 250 and the second audio device 255. The apparatus 200 may be configured to provide the captured audio signals by providing separate audio objects or by mixing captured audio signals with other captured audio signals.

A context of the first audio device 250 and the second audio device 255 may comprise different situations where the first user uses the first audio device 250 and the second user uses the second audio device 255. A context may comprise, for example, a situation where the first user using the first audio device 250 and the second user using the second audio device 255 are located in a same acoustically connected space near each other, a situation where the first user using the first audio device 250 and the second user using the second audio device 255 are located in a same acoustically connected space far apart from each other or a situation where the first user using the first audio device 250 and the second user using the second audio device 255 are located in acoustically disconnected spaces such as neighboring rooms.

According to an example embodiment, the apparatus 200 is configured to capture, if the first user and the second user are in the same acoustically connected space and are able to hear each other, the acoustical signal from the second user using the first audio device 250. In other words, there is no need for playback of the first user's voice to the second user or the second user's voice to the first user. The apparatus 200 is configured to provide the captured audio signals to the remote user, for example, as different audio objects.

According to an example embodiment, the apparatus 200 is configured to capture, if the first user and the second user are in the same acoustically connected space, but are not able to hear each other or if the first user and the second user are located in acoustically disconnected spaces, the acoustical signal from the first user and mix it to the output of the second user and the acoustical signal from the second user and mix it to the output of the first user.

According to an example embodiment, the context comprises information relating to acoustical connection of the first audio device 250 and the second audio device 255.

According to an example embodiment, the apparatus 200 is configured to modify the captured audio signals by performing wind noise reduction outdoors. For example, in outdoors scenarios, the first user may use both the first audio device 250 and the second audio device 255, and the apparatus 200 may be configured select a microphone comprised by the first audio device 250 or a microphone comprised by second audio device 255 depending upon which one does not show any wind noise issues. However, in response to deactivating and re-activating the second audio device, this may not be possible. Therefore, the apparatus 200 may be configured to update a microphone selection mechanism in response to receiving an indication that the second audio device 255 is re-activated by the second user.

The apparatus 200 may be configured to update the microphone selection mechanism by switching from a first mode of wind noise reduction to a second mode of wind noise reduction.

The first mode of wind noise reduction may comprise a case where a single user is using the first audio device 250 and the second audio device 255. Therefore, in the first mode of wind noise reduction the apparatus 200 may be configured to select, for microphone usage, from the first audio device 250 and the second audio device 255 the one that does not indicate wind noise issues.

The second mode of wind noise reduction may comprise a case where a first user uses the first audio device 250 and the second user uses the second audio device 255. Therefore, in the second mode of wind noise reduction the apparatus 200 is configured to activate a microphone both for the first audio device 250 and the second audio device 255 in which case it is possible that a microphone not indicating wind noise issues is not available. However, the apparatus 200 may be configured to activate the second audio device 255 to pick up, for example using audio beamforming, the voice of the first user, if the first user and the second user are close enough. Similarly, the apparatus 200 may be configured to activate the first audio device 250 to pick up, for example using audio beamforming, the voice of the second user, if the first user and the second user are close enough. The apparatus 200 may be configured to determine whether the first user and the second user are close enough based on acoustic distance estimation.

According to an example embodiment, the apparatus 200 comprises means for performing the features of the claimed invention, wherein the means for performing comprises at least one processor 110, at least one memory 160 including computer program code 120, the at least one memory 160 and the computer program code 120 configured to, with the at least one processor 110, cause the performance of the apparatus 200. The means for performing the features of the claimed invention may comprise means for providing spatial audio signals for output for a first user via a first audio device 250 and a second audio device 255, means for receiving an indication of deactivation of the second audio device 255, means for receiving an indication that the second audio device 255 is re-activated by a second user, and means for performing, in response to receiving an indication that the second audio device 255 is re-activated by the second user, a modification of the spatial audio signals.

The apparatus 200 may further comprise means for performing, in response to receiving the indication of deactivation of the second audio device 255, a modification of the spatial audio signals. The apparatus 200 may further comprise means for receiving captured audio signals from the first audio device 250 and the second audio device 255 and means for performing, in response to receiving an indication that the second audio device 255 is re-activated by the second user, a modification of captured audio signals provided to a remote user. The apparatus 200 may further comprise means for providing captured audio signals based on context of the first audio device 250 and the second audio device 255 and/or means for providing the spatial audio signals during a voice or video call.

Figure 3:
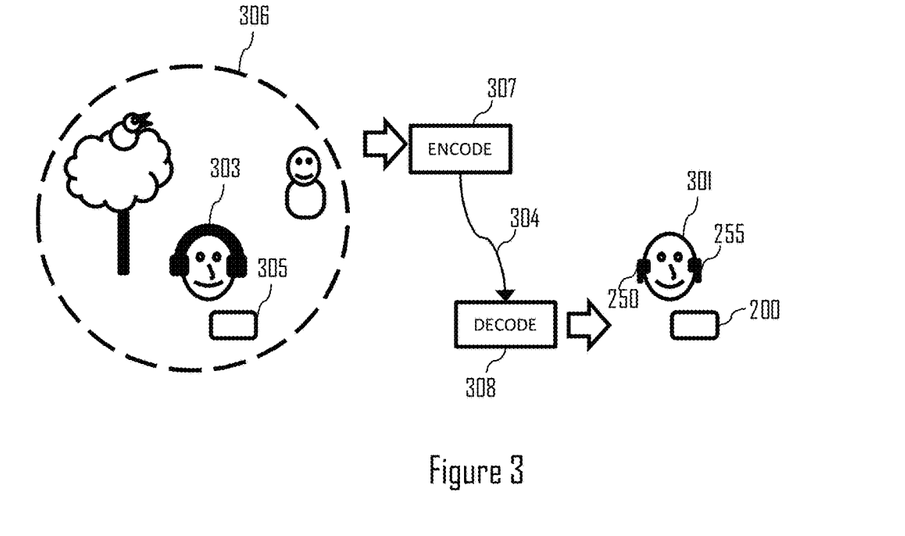
FIG. 3 illustrates an example system in which examples of the disclosed embodiments may be applied.

FIG. 3 illustrates an example system according to an example embodiment. In the example of FIG. 3, the apparatus 200 comprises an audio codec supporting receiving, transmitting and/or streaming user generated live content such as a voice or video call.

In the example of FIG. 3, a first user 301 is in a voice or video call with a remote user 303. The first user 301 communicates with the remote user 303 using a first audio device 250 and a second audio device 255 operatively connected to the apparatus 200. The first audio device 250 may comprise, for example, a first wireless headphone and the second audio device 255 may comprise, for example, a second wireless headphone. In the example of FIG. 3, the first audio device 250 and the second audio device 255 are configured to function as a pair by providing a stereo output for the first user 301.

The first audio device 250 and the second audio device 255 are wirelessly connected to the apparatus 200 using, for example, a Bluetooth connection. The first audio device 250 comprises at least one loudspeaker and at least one microphone. Similarly to the first audio device 250, the second audio device 255 comprises at least one loudspeaker and at least one microphone.

The apparatus 200 is configured to provide spatial audio signals received from the remote user 303 for the first user 301 via the first audio device 250 and the second audio device 255. The spatial audio signals may comprise, for example, an audio scene 306 of a spatial audio field comprising a voice object such as speech from the remote user 303 and ambient audio from the environment of the remote user 303.

In the example of FIG. 3, the audio signals are encoded 307, for example, by an audio codec comprised by the device 305 of the remote user and transmitted as a bitstream 304 using, for example, real-time transport protocol (RTP) to the apparatus 200 of the first user 301. The received bitstream is then decoded 308, for example, by the apparatus 200 comprising an audio codec.

The apparatus 200 is further configured to provide audio signals captured by the first audio device 250 and/or the second audio device 255 and provide the captured audio signals to the remote user 303 using the device 305. In the example of FIG. 3, the captured audio signals are encoded and transmitted by the apparatus 200 as a bitstream 304 to the remote user 303. The bitstream received by the remote user 303 may then be decoded by the device 305, for example.

Using a plurality of loudspeakers and microphones, the apparatus 200 may be configured to provide immersive two-way communication for the first user 301.

Figure 4:
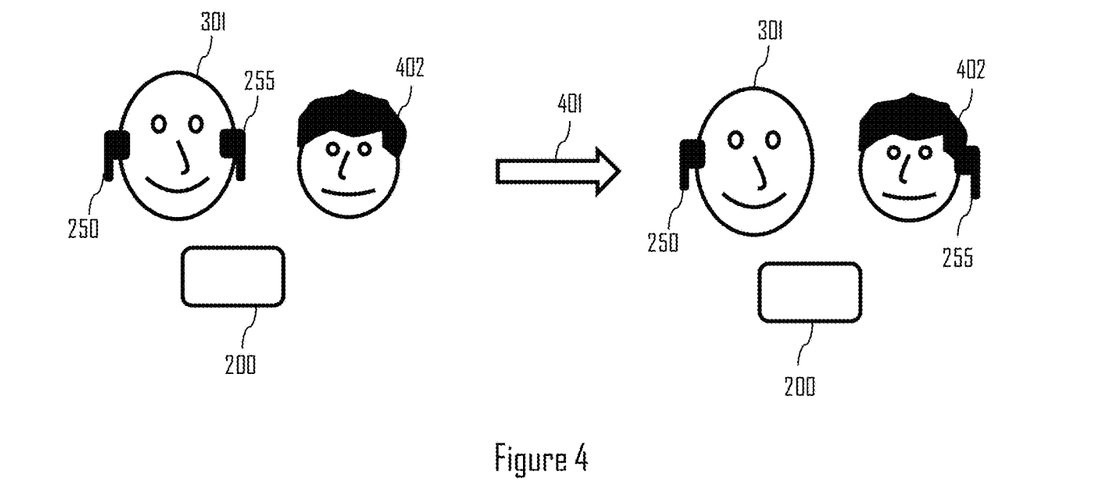
FIG. 4 illustrates another example system in which examples of the disclosed embodiments may be applied.

FIG. 4 illustrates another example system according to an example embodiment. In the example of FIG. 4, the apparatus 200 comprises an audio codec supporting receiving, transmitting and/or streaming user generated live content such as a voice or video call.

In the example of FIG. 4, the first user 301 is in a voice or video call with a remote user 303 illustrated in FIG. 3. The first user 301 may use the apparatus 200 for capturing audio signals and receiving spatial audio signals using the first audio device 250 and the second audio device 255. The first audio device 250 and the second audio device 255 are wirelessly connected to the apparatus 200 using, for example, a Bluetooth connection.

Similarly to the example of FIG. 3, the first audio device 250 comprises at least one loudspeaker and at least one microphone and the second audio device 255 comprises at least one loudspeaker and at least one microphone.

In the example of FIG. 4, the first user 301 gives (indicated by arrow 401) the second audio device 255 to a second user 402 for joining the voice or video call. The apparatus 200 is configured to receive an indication of deactivation of the second audio device 255. Deactivation of an audio device may comprise disabling the second audio device 255, disconnecting the second audio device 255 from the apparatus 200, removing the second audio device 255 from an in-ear position, or the like. In the example of FIG. 4, the apparatus 200 is configured to receive an indication from the second audio device 255 that it has been removed from an in-ear position.

In the example of FIG. 4, the apparatus 200 is further configured to receive an indication that the second audio device is re-activated by the second user 402. Re-activation of an audio device may comprise, for example, enabling the second audio device 255, connecting the second audio device 255 to the apparatus 200, detecting an in-ear position of the second audio device 255, or the like. In the example of FIG. 4, the apparatus 200 is configured to receive an indication from the second audio device 255 that is has been placed to in-ear position.

The apparatus 200 may be configured to determine that the second audio device 255 is re-activated by the second user 402 based on measurement data. The measurement data may relate to, for example, a distance between the first audio device 250 and the second audio device 255, a change in distance between the first audio device 250 and the second audio device 255, motion of the first audio device 250 or the second audio device 255, a difference between the positions of the first audio device 250 and the second audio device 255 (e.g. a difference between the altitude of the first audio device 250 and the altitude of the second audio device 255), characteristics of an ear of the first user 301 or the second user 402, or the like. In the example of FIG. 4, the apparatus 200 is configured to determine that the second audio device 255 is activated by a second user 402 based on a changed distance between the first audio device 250 and the second audio device 255.

In response to the second user 402 joining the voice or video call, the apparatus 200 is configured to receive captured audio signals from the first audio device 250 and the second audio device 255. Therefore, the first audio device 250 provides a first audio source and the second audio device 255 provides a second audio source, the first audio source and the second audio source being independent audio sources.

The apparatus 200 is configured to perform, in response to receiving the indication that the second audio device 255 is re-activated by the second user 402, a modification of captured audio signals provided to the remote user 303. Modification of captured audio signals may comprise modifying the captured audio signals based on contextual information. For example, modification of captured audio signals may comprise providing captured audio signals based on context of the first audio device 250 and the second audio device 255. The apparatus 200 may be configured to provide the captured audio signals by providing separate audio objects or by mixing captured audio signals with other captured audio signals.

The context may comprise, for example, information relating to acoustical connection of the first audio device 250 and the second audio device 255. For example, the apparatus 200 may be configured to capture, if the first user 301 and the second user 402 are in the same acoustically connected space and are able to hear each other, the acoustical signal from the second user 402 using the first audio device 250. In other words, there is no need for playback of the first user's 301 voice to the second user 402 or the second user's 402 voice to the first user 301. The apparatus 200 is configured to provide the captured audio signals to the remote user, for example, as different audio objects.

As another example, the apparatus 200 may be configured to capture, if the first user 301 and the second user 402 are in the same acoustically connected space, but are not able to hear each other or if the first user 301 and the second user 402 are located in acoustically disconnected spaces, the acoustical signal from the first user 301 and mix it to the output of the second user 402 and the acoustical signal from the second user 402 and mix it to the output of the first user 301.

Figure 5A:
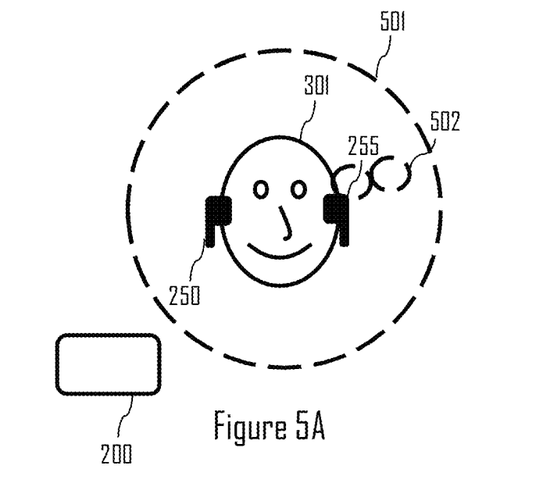
FIGS. 5A, 5B and 5C illustrate examples of modifying audio signals.
Figure 5B:
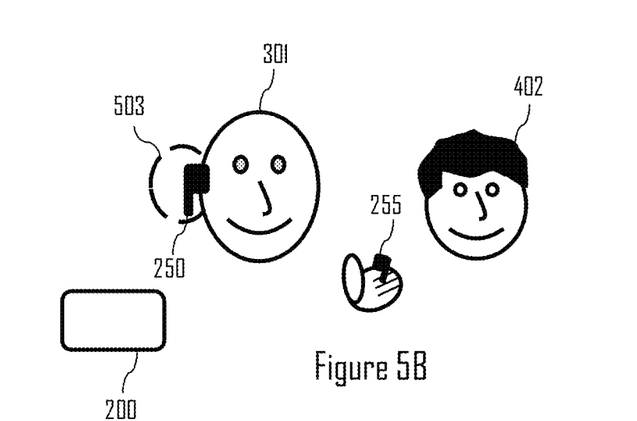
Figure 5C:
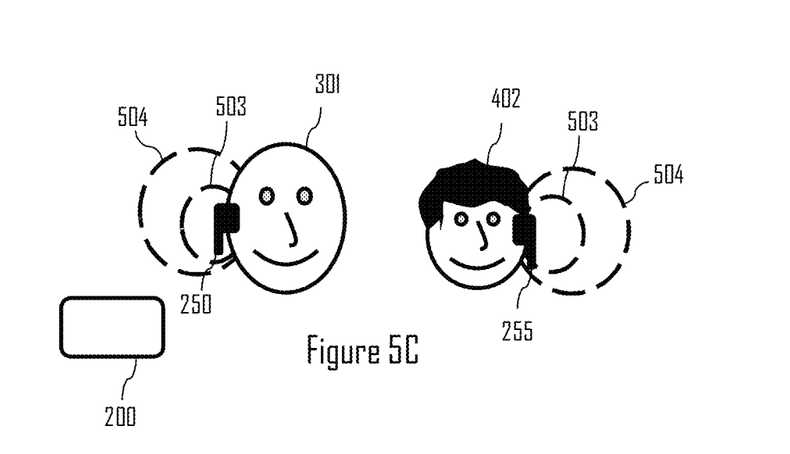

FIGS. 5A, 5B and 5C illustrate modifications performed by the apparatus 200 in response to receiving an indication of deactivation of the second audio device 255 and in response to receiving an indication that the second audio device 255 is re-activated by the second user 402 in the example of FIG. 4.

FIG. 5A illustrates the apparatus 200 configured to provide spatial audio signals for output for the first user 301 via the first audio device 250 and the second audio device 255. The spatial audio signals provide a spatial audio field 501 comprising an audio object 502 such as a directional voice object.

FIG. 5B illustrates a modification performed by the apparatus 200 in response to receiving an indication of deactivation of the second audio device 255. In the example of FIG. 5B, the apparatus 200 is configured to modify the spatial audio signals provided for the first user 301 such that playback of the spatial audio is optimized for the first user using a single audio device such as the first audio device 250. In the example of FIG. 5B, the apparatus 200 is configured to modify the spatial audio signals by adapting the spatial audio signals to mono playback while maintaining the audio object 503. Therefore, modifying the spatial audio signals may comprise, for example, removing ambient audio. As another example, the apparatus 200 may be configured to modify the spatial audio signal provided for the first user 301 be performing a mono-mix from the audio object 503 and ambient audio.

FIG. 5C illustrates a modification performed by the apparatus 200 in response to receiving an indication that the second audio device 255 is re-activated by the second user 402. In the example of FIG. 5C, the apparatus 200 is configured to modify the spatial audio signals by adapting the spatial audio signals such that the spatial audio is optimized for both the first user 301 and the second user 402. In the example of FIG. 5C the modification comprises maintaining the audio object 503 and adding playback of at least one additional audio component 504 such as mono ambience for both the first user 301 and the second user 402.

In response to the second user 402 joining the voice or video call, the apparatus 200 is configured to receive captured audio signals from the first audio device 250 and the second audio device 255. Therefore, the first audio device 250 provides a first audio source and the second audio device 255 provides a second audio source, the first audio source and the second audio source being independent audio sources.

Similarly to the example of FIG. 4, the apparatus 200 is configured to perform, in response to receiving the indication that the second audio device 255 is re-activated by the second user 402, a modification of captured audio signals provided to the remote user 303. Modification of captured audio signals may comprise modifying the captured audio signals based on contextual information. For example, modification of captured audio signals may comprise providing captured audio signals based on context of the first audio device 250 and the second audio device 255. The apparatus 200 may be configured to provide the captured audio signals by providing separate audio objects or by mixing captured audio signals with other captured audio signals.

The context may comprise, for example, information relating to acoustical connection of the first audio device 250 and the second audio device 255. For example, the apparatus 200 may be configured to capture, if the first user 301 and the second user 402 are in the same acoustically connected space and are able to hear each other, the acoustical signal from the second user 402 using the first audio device 250. In other words, there is no need for playback of the first user's 301 voice to the second user 402 or the second user's 402 voice to the first user 301. The apparatus 200 is configured to provide the captured audio signals to the remote user, for example, as different audio objects.

As another example, the apparatus 200 may be configured to capture, if the first user 301 and the second user 402 are in the same acoustically connected space, but are not able to hear each other or if the first user 301 and the second user 402 are located in acoustically disconnected spaces, the acoustical signal from the first user 301 and mix it to the output of the second user 402 and the acoustical signal from the second user 402 and mix it to the output of the first user 301.

Figure 6:
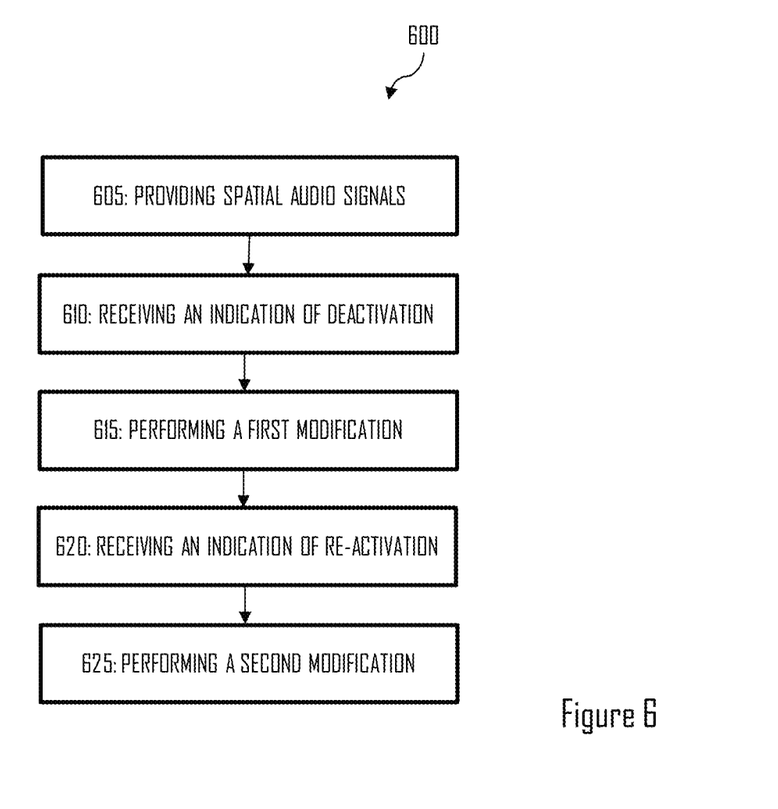
FIG. 6 illustrates an example method.

FIG. 6 illustrates an example method 600 incorporating aspects of the previously disclosed embodiments. More specifically the example method 600 illustrates providing spatial audio signals. The method may be performed by the apparatus 200 such as a mobile computing device.

The method starts with providing 605 spatial audio signals for output for a first user via a first audio device 250 and a second audio device 255. The first audio device 250 may comprise a first wireless audio device and the second audio device 255 may comprise a second wireless audio device.

The method continues with receiving 610 an indication of deactivation of the second audio device 255. Deactivation of the second audio device 255 may comprise disabling the second audio device 255, disconnecting the second audio device 255 from the apparatus 200, removing the second audio device 255 from an in-ear position, or the like.

The method further continues with performing 615, in response to receiving the indication of deactivation of the second audio device 255, a first modification of the spatial audio signals. However, it should be noted that in some example embodiments a first modification is not performed.

The first modification may comprise modifying the spatial audio signals provided for the first user 301 such that playback of the spatial audio is optimized for the first user using a single audio device such as the first audio device 250. Therefore, the first modification may comprise, for example, adapting the spatial audio signals to mono playback by maintaining the most important audio component and removing less important audio components. For example, the first modification may comprise maintaining a voice object and removing ambient audio.

The method further continues with receiving 620 an indication that the second audio device 255 is re-activated by a second user 402. Re-activation of the second audio device 255 may comprise, for example, enabling the second audio device 255, connecting the second audio device 255 to the apparatus 200, detecting an in-ear position of the second audio device 255, or the like. Receiving an indication that the second audio device 255 is re-activated may comprise detecting a change of status of the second audio device 255, detecting a change of status of the connection between the second audio device 255 and the apparatus 200, receiving measurement data relating to the status of the second audio device 255, receiving an indication from the second audio device 255 that the second audio device is re-activated, or a combination thereof.

The apparatus 200 may be configured to determine that the second audio device 255 is re-activated by a second user 402. Determining that the second audio device 255 is re-activated by the second user 402 may comprise, for example, determining that the second audio device 255 is re-activated by the second user 402 based on measurement data received by the apparatus 200. The measurement data may relate to, for example, a distance between the first audio device 250 and the second audio device 255, a change in distance between the first audio device 250 and the second audio device 255, motion of the first audio device 250 or the second audio device 255, a difference between the positions of the first audio device 250 and the second audio device 255 (e.g. a difference between the altitude of the first audio device 250 and the altitude of the second audio device 255), or the like.

The method further continues with performing 625, in response to receiving an indication that the second audio device 255 is re-activated by the second user 402, a second modification of the spatial audio signals. The second modification may comprise modifying the spatial audio signals such that the spatial audio is optimized for the first user 301 and the second user 402. The second modification may comprise, for example, adapting the spatial audio signals to a first mono playback and a second mono playback. For example, the second modification may comprise maintaining a voice object and adding playback of at least one additional component such as ambient audio.

Figure 7:
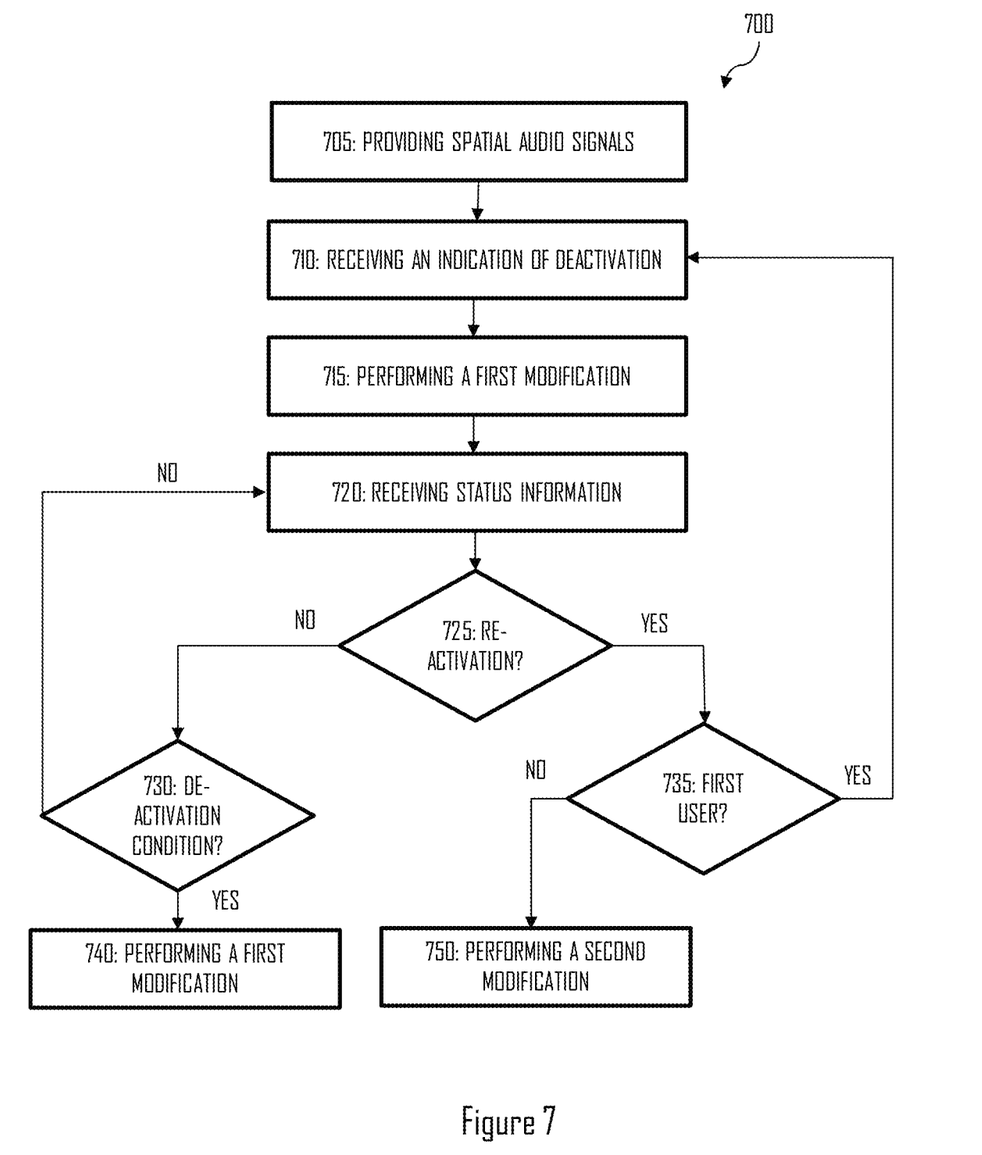
FIG. 7 illustrates another example method.

FIG. 7 illustrates another example method 700 incorporating aspects of the previously disclosed embodiments. The method may be performed by the apparatus 200 such as a mobile computing device.

The method starts with providing 705 spatial audio signals for output for a first user via a first audio device 250 and a second audio device 255. The first audio device 250 may comprise a first wireless audio device and the second audio device 255 may comprise a second wireless audio device.

The method continues with receiving 710 an indication of deactivation of the second audio device 255. Deactivation of the second audio device 255 may comprise disabling the second audio device 255, disconnecting the second audio device 255 from the apparatus 200, removing the second audio device 255 from an in-ear position, or the like.

The method further continues with performing 715, in response to receiving the indication of deactivation of the second audio device 255, a first modification of the spatial audio signals. The first modification may comprise modifying the spatial audio signals provided for the first user such that playback of the spatial audio is optimized for the first user 301 using a single audio device such as the first audio device 250. Therefore, the first modification may comprise, for example, adapting the spatial audio signals to mono playback. However, it should be noted that in some example embodiments a first modification is not performed.

The method further continues with receiving 720 status information relating to the second audio device 255. Based on the status information the apparatus 200 is configured to determine whether the second audio device 255 is deactivated or re-activated.

The method further continues with determining 725 whether the second audio device 255 is re-activated. If the second audio device 255 is not re-activated, the method continues with determining 730 whether a deactivation condition is fulfilled. A deactivation condition is fulfilled, if the second audio device 255 is not re-activated within a predetermined period of time. The predetermined period of time may comprise, for example, 1 to 20 seconds. For example, the predetermined period of time may comprise 1 sec, 5 secs, 10 secs, 15 secs or 20 secs.

If the de-activation condition is fulfilled, the method continues with performing 740 a first modification of the spatial audio signals. The first modification may comprise modifying the spatial audio signals provided for the first user 301 such that playback of the spatial audio is optimized for the first user 301 using a single audio device such as the first audio device 250. Therefore, the first modification may comprise, for example, adapting the spatial audio signals to mono playback by maintaining the most important audio component and removing less important audio components. For example, the first modification may comprise maintaining a voice object and removing ambient audio.

If the de-activation condition is not fulfilled, the method continues with receiving 720 status information relating to the second audio device 255.

If it is determined 725 that the second audio device 255 is re-activated, the method continues with determining 735 whether the second audio device 255 is re-activated by the first user 301. If the second audio device 255 is re-activated by the first user 301, the method continues to block 710.

If it is determined 735 that the second audio device 255 is not re-activated by the first user, the method continues with performing 750 a second modification of the spatial audio signals. The second modification may comprise modifying the spatial audio signals such that the spatial audio is optimized for the first user 301 and the second user 402. The second modification may comprise, for example, adapting the spatial audio signals to a first mono playback and a second mono playback. For example, the second modification may comprise maintaining a voice object and adding playback of at least one additional component such as ambient audio.

Without limiting the scope of the claims, an advantage of performing a first modification and a second modification of spatial audio based on deactivation and re-activation, respectively, of an audio device is that provision of spatial audio may be adjusted based on circumstances. An advantage of determining that an audio device is re-activated by a second user may be that provision and capture of spatial audio may be optimized for a plurality of users.

Without in any way limiting the scope, interpretation, or application of the claims appearing below, a technical effect of one or more of the example embodiments disclosed herein is that a party may be added to a voice or video call by sharing a set of headphones such as a pair of ear buds.

As used in this application, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments of the present invention may be implemented in software, hardware, application logic or a combination of software, hardware and application logic. The software, application logic and/or hardware may reside on the apparatus, a separate device or a plurality of devices. If desired, part of the software, application logic and/or hardware may reside on the apparatus, part of the software, application logic and/or hardware may reside on a separate device, and part of the software, application logic and/or hardware may reside on a plurality of devices. In an example embodiment, the application logic, software or an instruction set is maintained on any one of various conventional computer-readable media. In the context of this document, a 'computer-readable medium' may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus comprising:
   at least one processor; and
   at least one non-transitory memory including computer program code,
   the at least one memory and the computer program code configured to, with the at least one processor, cause the apparatus to perform at least the following:
   provide spatial audio signals for output for a first user via a first audio device and a second audio device;
   receive an indication of deactivation of the second audio device;
   perform, in response to receiving the indication of deactivation of the second audio device, a first modification of the spatial audio signals, wherein the first modification of the spatial audio signals comprises, at least, removing at least ambient audio from the spatial audio signals;
   receive an indication that the second audio device is re-activated by a second user; and
   perform, in response to receiving the indication that the second audio device is reactivated by the second user, a second modification of the spatial audio signals, wherein the second modification of the spatial audio signals comprises introducing at least one additional component to the spatial audio signals.

2. The apparatus according to claim 1, wherein the first audio device comprises a first wireless headphone and the second audio device comprises a second wireless headphone, the first wireless headphone and the second wireless headphone configured to function as a pair.

3. The apparatus according to claim 1, wherein the spatial audio signals comprise a first audio signal and a second audio signal.

4. The apparatus according to claim 3, wherein the first audio signal comprises an audio object and the second audio signal comprises the ambient audio.

5. The apparatus according to claim 1, wherein the indication that the second audio device is re-activated comprises information relating to a distance between the first audio device and the second audio device.

6. The apparatus according to claim 1, wherein the first modification of the spatial audio signals further comprises at least one of:
re-routing audio signals, of the spatial audio signals, from the second audio device to the first audio device, or
mixing at least one audio signal, of the spatial audio signals, for mono playback.

7. The apparatus according to claim 1, wherein the second modification of the spatial audio signals in response to receiving the indication that the second audio device is re-activated by the second user comprises introducing the ambient audio to the spatial audio signals, wherein the at least one additional component comprises the ambient audio.

8. The apparatus according to claim 1, further caused to receive captured audio signals from the first audio device and the second audio device.

9. The apparatus according to claim 8, further caused to perform, in response to receiving the indication that the second audio device is re-activated by the second user, a modification of the captured audio signals for provision to a remote user.

10. The apparatus according to claim 9, wherein the modification of the captured audio signals is based on context of the first audio device and the second audio device.

11. The apparatus according to claim 10, wherein the context comprises information relating to acoustical connection of the first audio device and the second audio device.

12. The apparatus according to claim 1, further caused to provide the spatial audio signals during a voice or video call.

13. A method comprising:
providing spatial audio signals for output for a first user via a first audio device and a second audio device;
receiving an indication of deactivation of the second audio device;
performing, in response to receiving the indication of deactivation of the second audio device, a first modification of the spatial audio signals, wherein the first modification of the spatial audio signals comprises, at least, removing at least ambient audio from the spatial audio signals;
receiving an indication that the second audio device is re-activated by a second user; and
performing, in response to receiving the indication that the second audio device is reactivated by the second user, a second modification of the spatial audio signals, wherein the second modification of the spatial audio signals comprises introducing at least one additional component to the spatial audio signals.

14. The method according claim 13, wherein the first audio device comprises a first wireless headphone and the second audio device comprises a second wireless headphone, the first wireless headphone and the second wireless headphone configured to function as a pair.

15. The method according to claim 13, wherein the spatial audio signals comprise a first audio signal and a second audio signal.

16. The method according to claim 15, wherein the first audio signal comprises an audio object and the second audio signal comprises the ambient audio.

17. The method according to claim 13, wherein the indication that the second audio device is re-activated comprises information relating to a distance between the first audio device and the second audio device.

18. A non-transitory computer readable medium comprising program instructions stored thereon for performing at least the following:
providing spatial audio signals for output for a first user via a first audio device and a second audio device;
receiving an indication of deactivation of the second audio device;
performing, in response to receiving the indication of deactivation of the second audio device, a first modification of the spatial audio signals, wherein the first modification of the spatial audio signals comprises, at least, removing at least ambient audio from the spatial audio signals;
receiving an indication that the second audio device is re-activated by a second user; and
performing, in response to receiving the indication that the second audio device is reactivated by the second user, a second modification of the spatial audio signals, wherein the second modification of the spatial audio signals comprises introducing at least one additional component to the spatial audio signals.

* * * * *